INVENTOR
K. H. Markowz

May 5, 1970   K. H. MARKOWZ   3,510,156
DEVICE FOR TRANSMITTING FLOWS

Filed March 27, 1968   8 Sheets-Sheet 3

INVENTOR
K. H. Markowz
BY
Richards & Geier
ATTORNEYS

May 5, 1970  K. H. MARKOWZ  3,510,156
DEVICE FOR TRANSMITTING FLOWS

Filed March 27, 1968  8 Sheets-Sheet 4

INVENTOR
K. H. Markowz
BY Richards & Geier
ATTORNEYS

May 5, 1970 K. H. MARKOWZ 3,510,156
DEVICE FOR TRANSMITTING FLOWS
Filed March 27, 1968 8 Sheets-Sheet 5

INVENTOR
K. H. Markowz
BY Richards & Geier
ATTORNEYS

May 5, 1970    K. H. MARKOWZ    3,510,156
DEVICE FOR TRANSMITTING FLOWS

Filed March 27, 1968    8 Sheets-Sheet 6

INVENTOR
K.H. Markowz
BY Richards & Geier
ATTORNEYS

May 5, 1970 K. H. MARKOWZ 3,510,156
DEVICE FOR TRANSMITTING FLOWS
Filed March 27, 1968 8 Sheets-Sheet 7

INVENTOR
K. H. Markowz
BY Richards & Geier
ATTORNEYS

INVENTOR
K. H. Markowz
BY Richards & Geier
ATTORNEYS

United States Patent Office 3,510,156
Patented May 5, 1970

3,510,156
DEVICE FOR TRANSMITTING FLOWS
Karl Heinz Markowz, 18 Guttentag-Loben-Strasse,
5657 Haan, Rhineland, Germany
Filed Mar. 27, 1968, Ser. No. 716,635
Claims priority, application Germany, Apr. 1, 1967,
1,600,511; Feb. 5, 1968, M 61,290; Mar. 9, 1968,
M 61,620
Int. Cl. F16l 41/00
U.S. Cl. 285—132   3 Claims

ABSTRACT OF THE DISCLOSURE

A device for providing intersection and continuous flow of currents which are conducted separately in pipes and which extend across each other without changing their levels is characterized by a ring enclosing a straight pipe and provided with connecting openings for a second pipe, the ring having curved side edges which form an annular hollow space around the straight pipe and which are firmly connected therewith by soldering, gluing or welding.

---

This invention relates to a device for transmitting flows and refers more particularly to a device for providing a crossing and a continuous flow of two currents conducted separately in pipes without changing their levels and to process for assembling this device.

Specifically the invention is concerned with a tubular form piece or fitting used for changing the directions, branching off or providing crossings of media flowing in pipes.

In modern engineering very many tubular or pipe conduits are used for transporting solid, gaseous and liquid substances. Technical requirements or space conditions often make it necessary for these conduits to cross each other. Such crossings result in losses in space and height since it is necessary to provided curved pieces extending over the crossings. In order to avoid these losses, cast fittings have been used (Swiss Pat. No. 381,030) which combine two conduits in one block with one current being guided either above or below the other current within the fitting. These fittings of special type are difficult to manufacture, since they require a precise casting with complicated cores; they have the further drawback that they must be very precisely set and that they attain only incompletely the important object of structural height saving.

Furthermore, these cast fitting blocks do not provide for any compensation of expansion which is unavoidable due to the difference in temperatures which takes place in the course of operations. These are the reasons why such fitting blocks were not successful in actual practice.

The manufacture of these branches or intersections is expensive and consumes a great deal of time. Manual labor must be often used on ladders or scaffolds. Flanging tools for the proper expansion are not always available so that in many instances pliers are used and a connection of poor workmanship is produced. A connecting curved piece with its one-sided welded location produces necessarily a warping of the connected pipe so that thereafter this section has to be straightened out with a considerable loss of time.

Furthermore, in order to bend the required curved pieces on location, a tube bender and a welding device must be available close by. Time delays for the transporting of the devices are unavoidable and two workmen are always required for the bending. Furthermore, the optical picture of the curved pieces thus produced is definately bad.

Since conditions in actual practice usually deviate from those set forth in blueprints, this fitting did not facilitate the desired production of pipe sections for the later use in pipe conduction structures since precision required for the assembling is not available for this type of work.

An object of the present invention is to provide an improved type of the above-described fittings.

Another object is to eliminate the above described prior art drawbacks by producing an improved fitting for intersecting flows which is of such shape that it involves no loss in height and can be inexpensively and easily produced from sheet metal as well as a casting.

Other objects of the present invention will become apparent in the course of the following specification.

In the accomplishment of the objectives of the present invention it was found desirable to construct a device providing for the crossing and continuous flow of currents in pipes, the currents flow ing separately and the crossing taking place without change of levels. The device of the present invention is a fitting having a ring with flanged side wall ends tightly engaging an outer wall of a straight pipe and forming an annular hollow space, the pipe providing the flow for one current while the ring has connecting openings for the second current. The ring is firmly connected with the pipe by soldering, gluing or welding.

The invention will appear more clearly from the following detailed description when taken in connection with the accompanying drawings, showing by way of example, preferred embodiments of the inventive idea.

Figure 1:
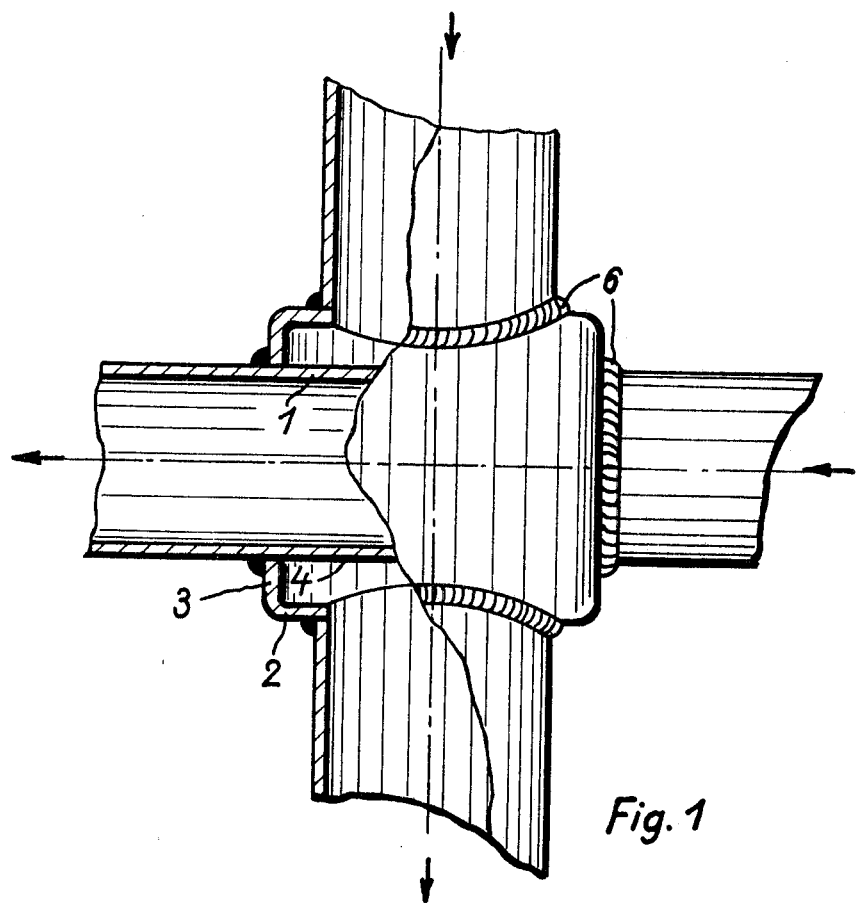
FIG. 1 is partly a side view of, and partly a section through, a device of the present invention which is made of sheet metal.

FIG. 1 shows a device of the present invention which is made of sheet metal. A straight pipe 1 is enclosed by a ring 2 having side walls 3 which are flanged at their ends. The side walls 3 enclose firmly the outer wall of the pipe 1 which conducts the undivided stream along a straight path. This device can be constructed by mounting the ring 2 with its connecting openings and the side walls 3 upon the pipe 1 at the location where the intersection is to take place, and then tightly attaching the ring. However, it is also possible to provide a complete device with the ring 2 welded to the pipe 1 and attach the pipe connections later on in the usual manner. The welding beads are indicated by the numeral 6 in FIG. 1.

Figures 2, 4:
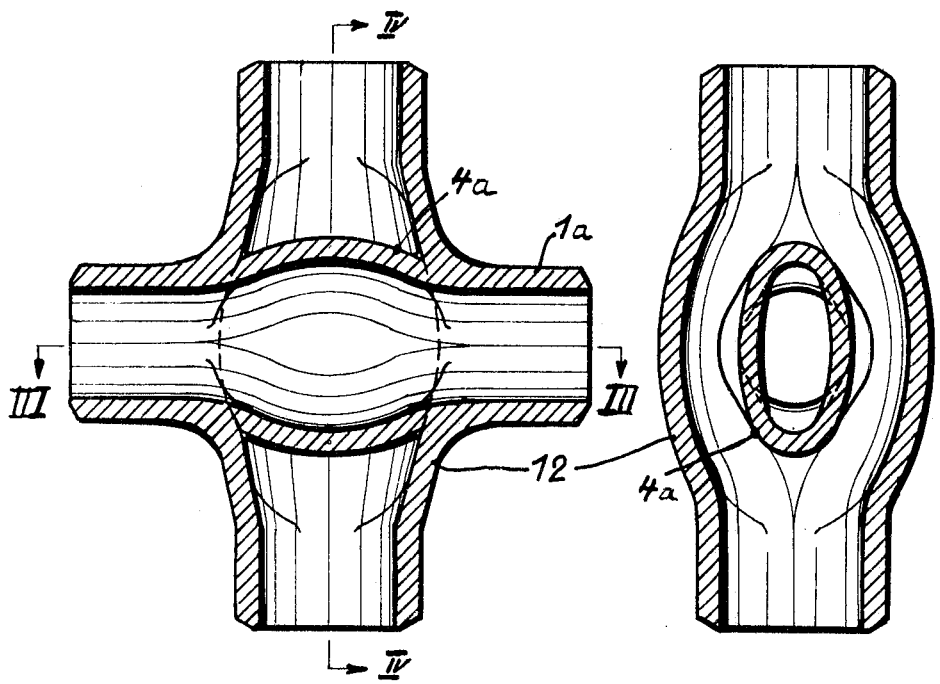
FIG. 2 is a section through another device made as a casting.
FIG. 4 is a section along the line IV—IV of FIG. 2.
Figure 3:
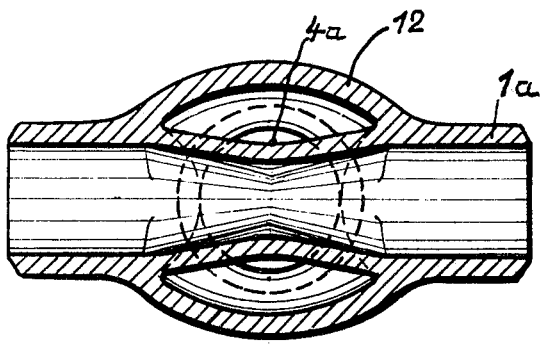
FIG. 3 is a section along the line III—III of FIG. 2.

FIGS. 2–4 show a device of the present invention consisting of a cast body with four connections for two flows. In order to adapt the flow cross sections in the intersection to the greatest possible extent to the cross sections of the pipes—and thus to eliminate as much as possible losses in pressure while retaining a compact structure—the directly flowing main current is pulled lens-like in cross section within the device, as clearly shown in FIGS. 3 and 4. The crossing current is divided by the outer wall 4a of the pipe 1a in such a manner that a part of it flows under the directly flowing main current, while another part flows above it within the device. At the end of the crossing the two parts are again united into a single current flowing in the same direction.

Figure 5:
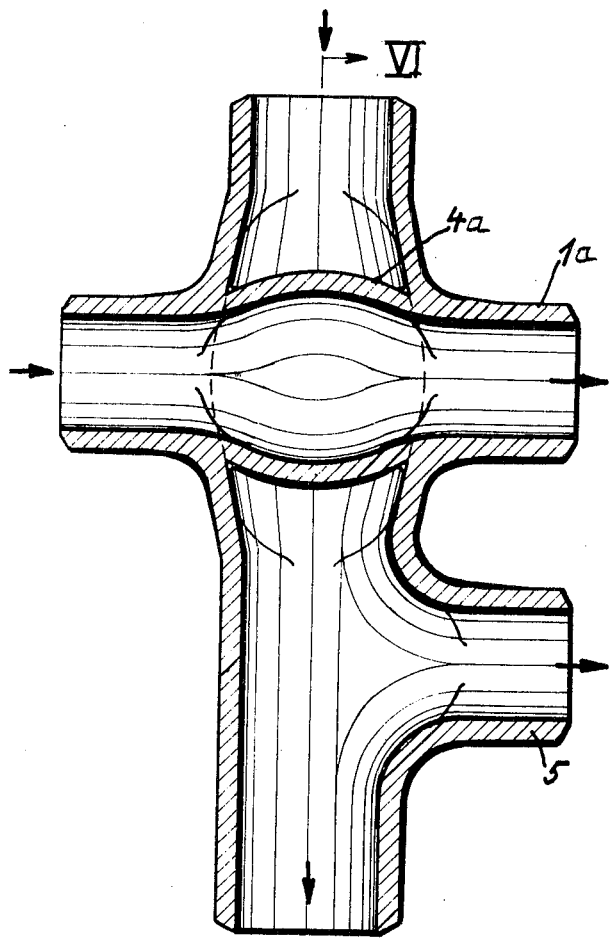
FIG. 5 is a section through a somewhat different construction.
Figure 6:
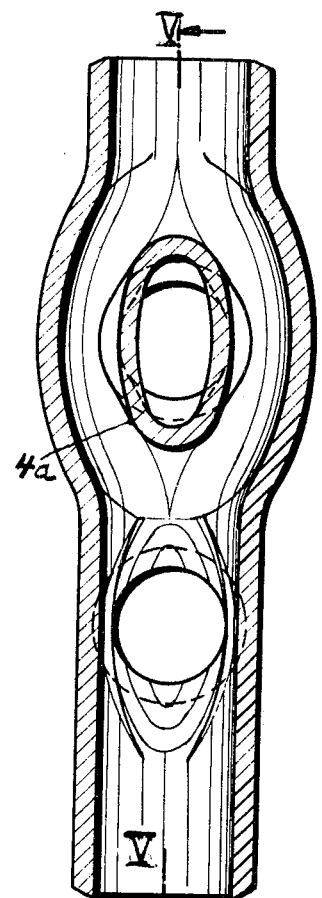
FIG. 6 is a section along the line VI—VI of FIG. 5.

FIGS. 5 and 6 show a similar construction which, however, is provided with a fifth branch pipe 5. This particularly advantageous construction provides for the branching of the two flows upon the same level.

In accordance with the basic feature of the present invention two currents cross each other within the device which are or may be different as far as their temperatures and/or compositions are concerned. FIGS. 7–20 compare the different constructions of conduits in prior art devices with those made in accordance with the present invention.

Figure 7:
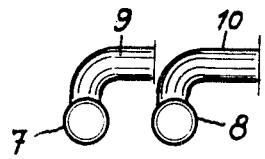
FIG. 7 is a diagram showing a prior art arrangement of two pipe branches located next to each other upon the same level.
Figure 8:
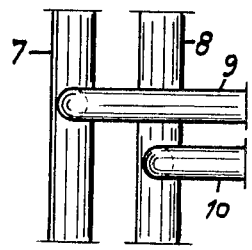
FIG. 8 is a top view of the arrangement shown in FIG. 7.

FIGS. 7 and 8 show the usual prior art construction with the curved pipe ends 9 and 10 joining the main pipes 7 and 8. The result is a substantial loss in height.

Figure 9:
FIG. 9 is similar to FIG. 7 but shows the arrangement of the present invention.
Figure 10:
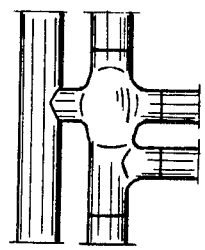
FIG. 10 is a top view of the arrangement shown in FIG. 9.

FIGS. 9 and 10 illustrate a similar construction of the present invention and show (particularly FIG. 9) that according to the invention, there is no height loss.

Figure 11:
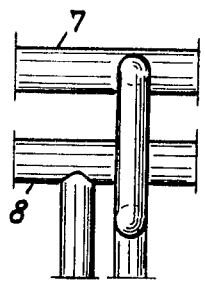
FIGS. 11, 12 and 13 show, from three different sides, a prior art arrangement somewhat similar to that of FIGS. 7 and 8, but also showing the return of a bent pipe into the initial level.
Figure 13:
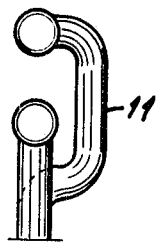
Figure 12:

In a similar manner, FIGS. 11 to 13 show a prior art construction using a pipe 11 with double curvature which balances the loss in height after the intersection but has the same drawbacks in the intersection. The pipe 11 joins the main pipes 7a and 8a.

Figure 14:
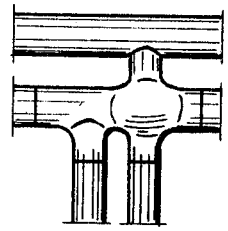
FIGS. 14 and 15 are two side views of an arrangement similar to that of FIGS. 11, 12 and 13 but constituting the present invention.
Figure 15:

FIGS. 14 and 15 illustrate a similar construction of the present invention and show that the present invention avoids any loss in height, at the crossing as well as elsewhere.

Figure 16:
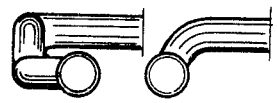
FIGS. 16, 17 and 18 show, from three different sides, a prior art arrangement of branched off pipes with double intersection of the two main conduits.
Figure 18:
Figure 17:
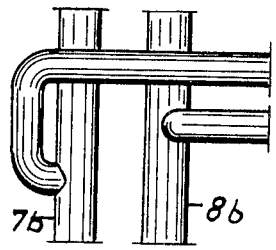

FIGS. 16 to 18 show a prior art construction which is often used and which consists of a double intersection with main pipes 7b and 8b.

Figure 19:
FIGS. 19 and 20 are two side views of an arrangement similar to that of FIGS. 16, 17 and 18 but constituting the present invention.
Figure 20:
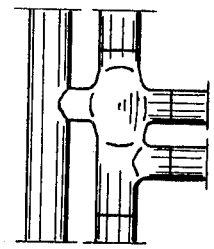

FIGS. 19 and 20 show that the present invention has simplified the construction and provided the same advantages.

One of the objects of the present invention is to provide an assembly procedure for the intersection of two pipes without loss in height and providing the greatest possible expansion balance. A precision greater than raw structural tolerances is not required any more. In solving this object the present invention provides a form piece 12 (FIG. 21) for the intersection of pipe conduits. The form piece 12 freely slides upon the main pipe 15 up to the time of the final attachment. At that time at the latest, the form piece 12 receives the inflow and outflow openings 13 and 14. After the final attachment the form piece 12 encloses the main pipe 15 at a distance forming an annular space 22. However, the form piece 12 need not have the connecting openings prior to its final attachment. In that case it consists initially of a closed hollow ring 12a.

Figure 21:
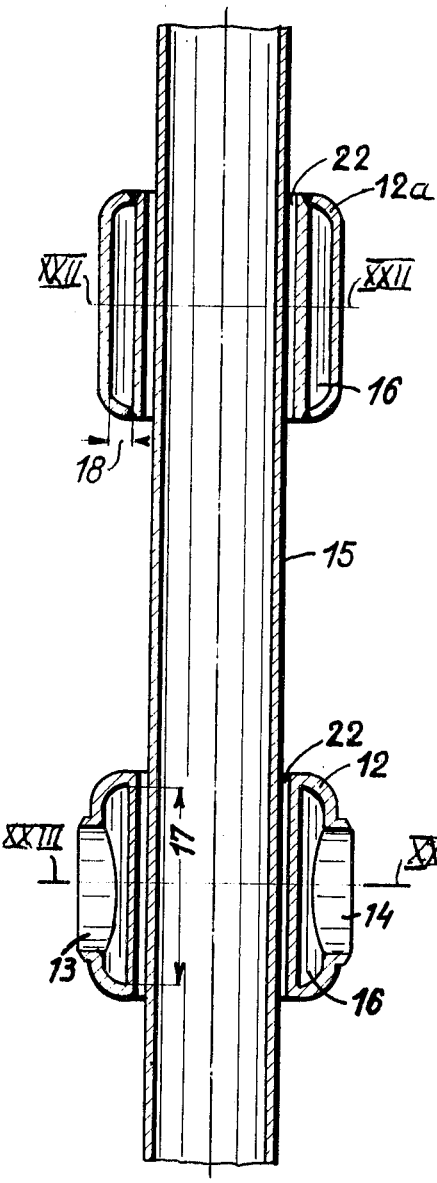
FIG. 21 is a section through another device constructed in accordance with the present invention.
Figure 22:
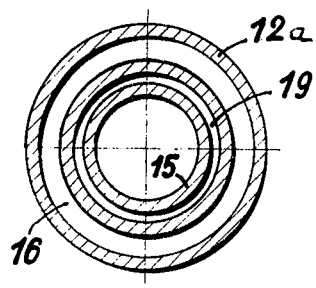
FIG. 22 is a section along the line XXII–XXII of FIG. 21.
Figure 23:
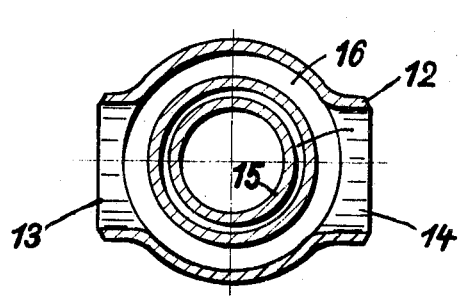
FIG. 23 is a section along the line XXIII—XXIII of FIG. 21.

FIGS. 21 to 23 show this initial form piece 12a wtihout the connecting openings after mounting and the final form piece 12 provided wtih the openings 13 and 14 and ready to be connected. As already stated, the inner diameter of the form piece is sufficiently large so that it can slide upon the main pipe 15. The initial shape of the form piece 12a without the openings has the advantage that the location of these openings does not have to be preset in advance. This is particularly advantageous when the pipes to be attached to the form piece are not straight but extend at an angle or when several pipes are to be attached. In that case the form piece 12a can serve for divisions into several flows. The advantage of balancing the expansion is provided by the annular space 22 between the pipe 15 and the inner diameter of the form piece 12. This construction of the form piece 12 provides an expansion balance to all pipe conduits participating in the construction. The connecting openings can be provided at the attachment location by cutting, burning or the use of a drift.

In addition to the elimination of any loss in height and the balancing of expansions when conduits get hot, the arrangement of the initial form piece 12a as a hollow ring has the particular advantage that the form piece with or without the connecting openings can slide upon the pipe 15 which has been already fixed, so that the location of the intersection does not have to be selected in advance. The form piece can be fixed at a later stage of the construction while the location of intersection has been determined. This arrangement greatly simplifies the assembly and supplies parts made in advance, which is greatly desired by modern pipe engineering.

Of importance is the shape of the interior of the form piece. The cross section of the annular space 16 within the form piece should at least correspond to the cross section of one of the openings 13 or 14. To make the location of the knot as flat as possible, the length 17 of the space 16, measured in the direction of the pipe 15, should be always a multiple of the width 18 extending perpendicularly to the pipe 15. This provides a very flat intersection area.

Constructions shown in FIGS. 24–29 have the purpose of providing an inner chamber with the least possible flow loss. The task of providing a flow-correct shape for the guiding cross sections is attained by the present invention through the arrangement of a circular curve extending over a straight line or an approximately straight line which is closest to the pipe being intersected and which forms the base for the flow redirecting cross section, the ends of the curve going over into the straight line and thus limiting the hollow cross section.

Figures 24, 25:
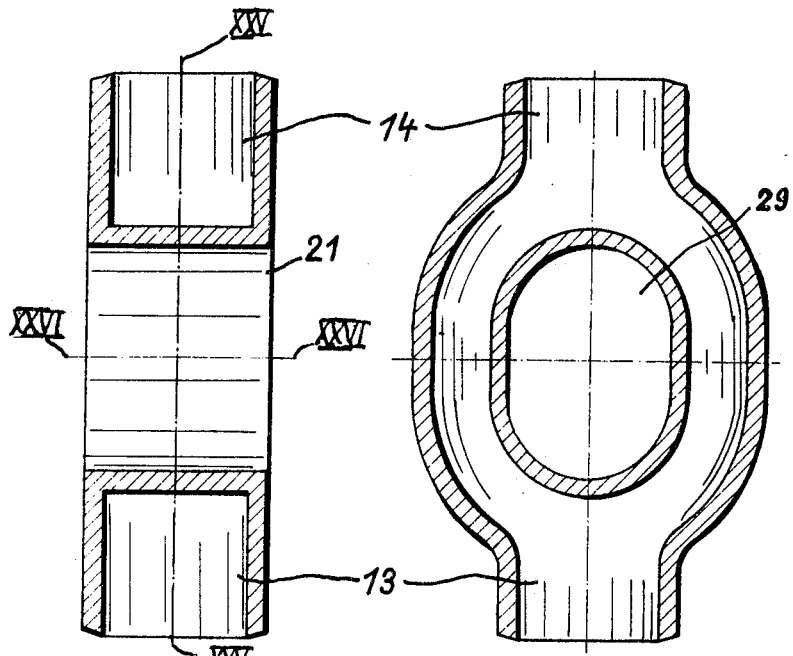
FIG. 24 is a longitudinal section through yet another embodiment of the present invention.
FIG. 25 is a section along the line XXV—XXV of FIG. 24.
Figure 26:
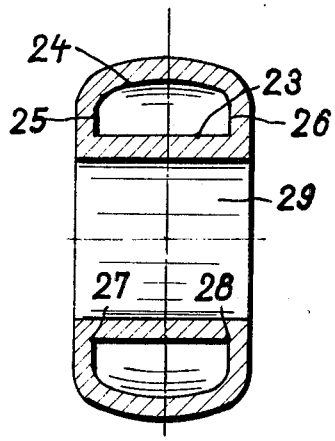
FIG. 26 is a section along the line XXVI—XXVI of FIG. 24.

FIGS. 24–26 show an embodiment of such a device wherein the redirecting cross section consists of a straight line 23, circular curve 24 and two straight lines 25 and 26 joining the curve. The base 23 is connected with the lines 25 and 26 at the end points 27 and 28. The central opening 29 is oval in cross section. This oval form makes possible extensive movements of the main pipe which is inserted through the opening 29 and which conducts the flow of current.

The correct hydrodynamic shape of the interior avoids the formation of eddies at the corners. Consequently there is also no formation of air pockets in these corners which present a problem in practically every conduit system since they may produce noises and cause corrosions.

Thus the device of the present invention is most suitable for incorporation into modern heating plants with greater flow velocities.

Figures 27, 28:
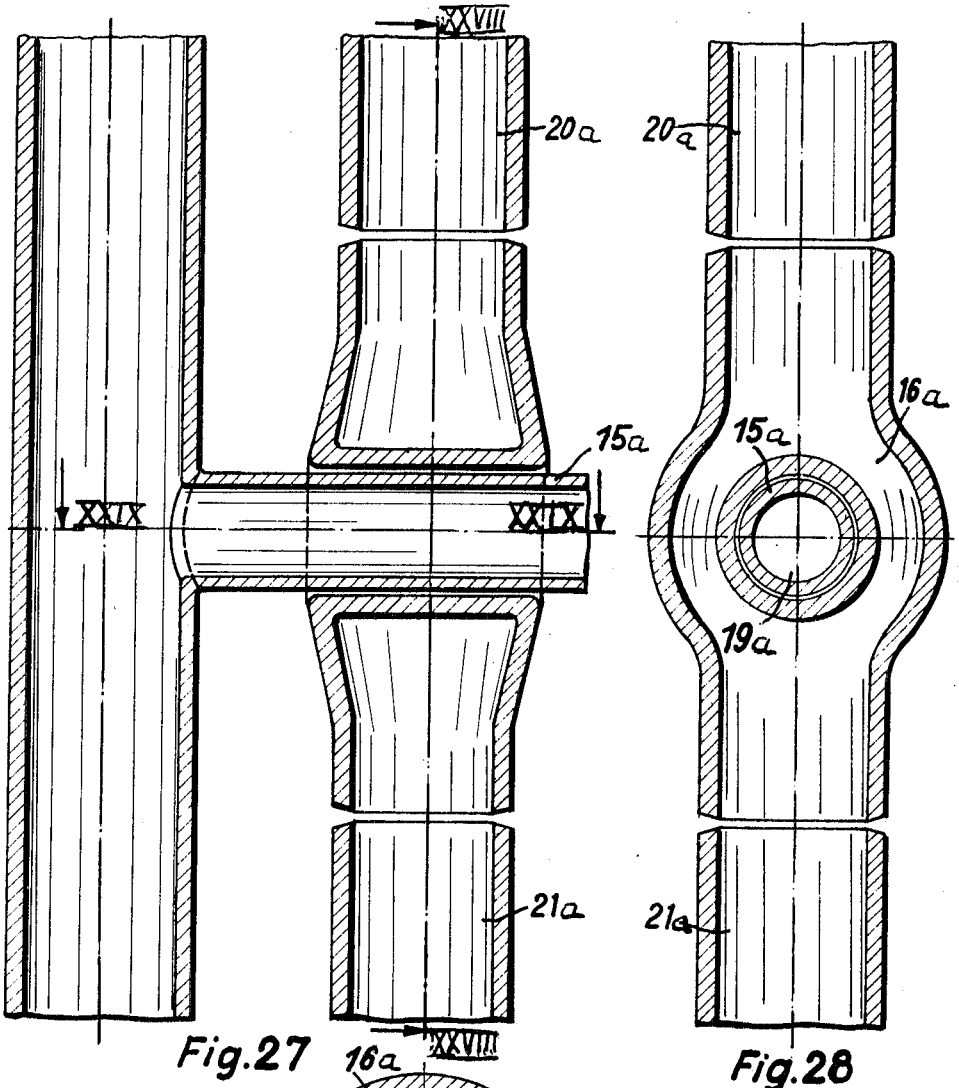
FIG. 27 is a section through pipe conduits of the present invention having an annular intersection space.
FIG. 28 is a section along the line XXVIII—XXVIII of FIG. 27.
Figure 29:
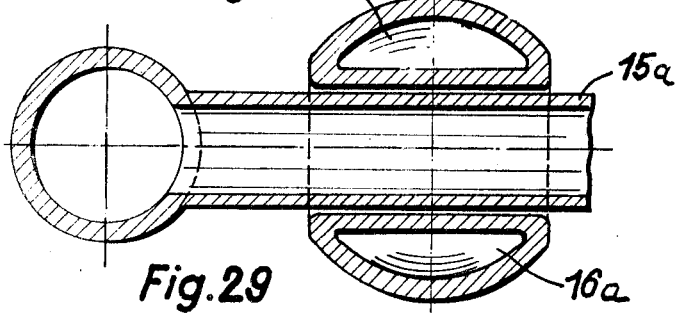
FIG. 29 is a section along the line XXIX—XXIX of FIG. 27.

FIGS. 27 to 29 show a construction wherein the main pipe has a perpendicular branch 15a which extends into an opening 19a provided at the connection 16a of the pipes 20a and 21a. As shown in FIG. 28, the pipe 15a is inserted with comparatively small play so that the balancing of expansions is comparatively limited.

Applicant has conducted actual experiments to determine savings in time attained with the devices of the present invention. These tests were conducted under precisely the same conditions, but even somewhat detrimental to the applicant due to the fact that all the auxiliary tools were available directly at the location of the assembly. Nevertheless the tests showed that the use of applicant's devices results in a saving of 12 minutes for each intersection assembly.

Other advantages of applicant's devices are also of substantial importance. Thus the bending devices required in prior art are eliminated. The thermic energy required for the bending is saved and it is possible to operate with a minimum of tools. It is possible to arrange the entire branching of a pipe system upon one plane. Applicant's fitting can be used universally and can be introduced into any location. The pipe system becomes easy for overseeing and adjacent installations do not disturb each other.

Applicant's fitting constitutes an important step towards advance mass production for pipe conduits and other technics, which so far was considered impossible due to the difficult connecting and distributing problems.

The fitting of the present invention constitutes important means for producing compact structures in all branches of industry which use flowing media.

It is apparent that the examples described above have been given solely by way of illustration and not by way of limitation and that they are capable of many variations and modifications within the scope of the present invention. All such variations and modifications are to be included within the scope of the present invention.

What is claimed is:

1. A device for providing a crossing of at least two separate flows, said device comprising, in combination with a pipe, a form piece secured upon said pipe and having an inner annular wall enclosing a portion of said pipe and spaced therefrom, said form piece further having an annular outer wall spaced from and surrounding said inner wall, annular end walls connecting the ends of said inner and outer walls, said inner and outer walls being substantially parallel to the longitudinal axis of said pipe, whereby an inner annular space is formed between said inner and outer walls, and at least two outwardly extending tubular outlets connected with said outer wall intermediate said end walls and communicating with said inner space.

2. A device in accordance with claim 1, wherein the inner space of said form piece has an oval portion.

3. A device in accordance with claim 1, wherein the cross sectional area of said annular hollow space is at least equal to that of the first-mentioned pipe and wherein the length of said annular hollow space is many times greater than its width.

References Cited

UNITED STATES PATENTS

| | | | |
|---|---|---|---|
| 381,289 | 4/1888 | Stephens. | |
| 408,826 | 8/1889 | Conroy | 285—150 |
| 548,998 | 10/1895 | Mannesmann | 285—150 |
| 1,056,239 | 3/1913 | Ward | 285—150 X |
| 1,579,159 | 3/1926 | Spikings. | |
| 1,582,529 | 4/1926 | Mueller | 137—594 X |
| 1,782,017 | 11/1930 | Shanks et al. | 285—150 X |
| 2,101,707 | 12/1937 | Ewing. | |
| 2,546,502 | 3/1951 | Harrington | 285—132 X |
| 3,307,205 | 3/1967 | Moeschler | 4—192 |

FOREIGN PATENTS

| | | |
|---|---|---|
| 642,407 | 3/1937 | Germany. |
| 952,395 | 11/1956 | Germany. |
| 22,722 | 1898 | Great Britain. |
| 952,395 | 11/1956 | Germany. |
| 1,205,994 | 12/1965 | Germany. |

THOMAS F. CALLAGHAN, Primary Examiner

U.S. Cl. X.R.

285—150